United States Patent
Luongo

(10) Patent No.: US 11,487,976 B2
(45) Date of Patent: *Nov. 1, 2022

(54) METHOD OF CLASSIFICATION OF IMAGES AMONG DIFFERENT CLASSES

(71) Applicant: BULL SAS, Les Clayes-sous-Bois (FR)

(72) Inventor: Alessandro Luongo, Bezons (FR)

(73) Assignee: BULL SAS, Les Clayes sous Bois (FR)

( * ) Notice: Subject to any disclaimer, the term of this patent is extended or adjusted under 35 U.S.C. 154(b) by 366 days.

This patent is subject to a terminal disclaimer.

(21) Appl. No.: 16/728,517

(22) Filed: Dec. 27, 2019

(65) Prior Publication Data

US 2020/0210755 A1 Jul. 2, 2020

(30) Foreign Application Priority Data

Dec. 27, 2018 (EP) ..................................... 18306859

(51) Int. Cl.
*G06V 30/00* (2022.01)
*G06K 9/62* (2022.01)
(Continued)

(52) U.S. Cl.
CPC ............ *G06K 9/628* (2013.01); *G06F 17/145* (2013.01); *G06K 9/6232* (2013.01);
(Continued)

(58) Field of Classification Search
CPC ........ G06K 9/66; G06K 9/344; G06K 9/4628; G06K 9/2013; G06K 9/6216;
(Continued)

(56) References Cited

U.S. PATENT DOCUMENTS

| 5,453,940 A | * | 9/1995 | Broomhead | ........... | A61B 5/369 |
| | | | | | 702/109 |
| 5,686,961 A | * | 11/1997 | Gasztonyi | ............ | H04N 19/162 |
| | | | | | 375/E7.145 |

(Continued)

OTHER PUBLICATIONS

Office Action for corresponding Europeam Application No. 18306859.2, dated Jul. 21, 2021.

(Continued)

*Primary Examiner* — Amir Alavi
(74) *Attorney, Agent, or Firm* — Meagher Emanuel Laks Goldberg & Liao, LLP

(57) ABSTRACT

This invention relates to a method of classification of images among different classes comprising: performing a dimensionality reduction step for said different classes on a training set of images whose classes are known, and then classifying one or more unknown images among said different classes with reduced dimensionality, said dimensionality reduction step being performed on said training set of images by machine learning including processing, for at least a first matrix and for at least a second matrix, a parameter representative of a product of two first and second matrices to assess to which given classes several first given images respectively belong: first matrix representing the concatenation, for said several first given images, of the values of the pixels of each said first given image, second matrix representing the concatenation, for said several first given images, of the values of differences between the pixels of each said first given image and the pixels of a second given image different from said first given image but known to belong to same class as said first given image, wherein: a quantum singular value estimation is performed on first matrix, a quantum singular value estimation is performed on second matrix, both quantum singular value estimation of first matrix and quantum singular value estimation of second (Continued)

matrix are combined together, via quantum calculation, so as to get at a quantum singular value estimation of said product of both first and second matrices, said quantum singular value estimation of said product of both first and second matrices being said parameter representative of said product of two first and second matrices processed to assess to which given classes said several first given images respectively belong.

18 Claims, 4 Drawing Sheets

(51) Int. Cl.
    *G06N 10/00*     (2022.01)
    *G06N 20/00*     (2019.01)
    *G06F 17/14*     (2006.01)
    *G06V 30/10*     (2022.01)

(52) U.S. Cl.
    CPC ........... *G06K 9/6256* (2013.01); *G06N 10/00* (2019.01); *G06N 20/00* (2019.01); *G06V 30/10* (2022.01)

(58) Field of Classification Search
    CPC .... G06K 9/6254; G06K 9/6255; G06K 9/628; G06K 9/6232; G06K 9/6256; G06K 9/6259; G06F 17/145; G06F 17/16; H04L 63/0227; H04L 63/0209; G06N 10/00; G06N 20/00; G06V 30/10
    See application file for complete search history.

(56) References Cited

U.S. PATENT DOCUMENTS

| | | | | |
|---|---|---|---|---|
| 6,564,176 | B2 * | 5/2003 | Kadtke | G06K 9/6217 703/2 |
| 6,922,715 | B2 * | 7/2005 | Kobayashi | G06F 17/16 708/200 |
| 7,870,083 | B2 * | 1/2011 | Zhu | G06N 20/00 702/85 |
| 10,671,697 | B1 * | 6/2020 | Batruni | G06F 17/16 |
| 2008/0137969 | A1 * | 6/2008 | Rueckert | G06K 9/6234 382/224 |
| 2020/0202248 | A1 * | 6/2020 | Mezzacapo | G06N 10/00 |
| 2020/0210755 | A1 * | 7/2020 | Luongo | G06K 9/6232 |
| 2020/0213276 | A1 * | 7/2020 | Luongo | G06F 17/16 |
| 2020/0218776 | A1 * | 7/2020 | Shah | G06N 7/005 |
| 2020/0364599 | A1 * | 11/2020 | Ma | G06N 10/00 |

OTHER PUBLICATIONS

Kerenidis et al., "Quantum classification of the MNIST dataset via Slow Feature Analysis", XP055598184, pp. 1-25, Jun. 12, 2018.
Search report of the European Patent Office for EP18306859.2 with search date of Jun. 21, 2019.
Extended Search Report and Written Opinion of the European Patent Office for EP18306859.2 with search date of Jul. 10, 2019.
Kerenidis, I., Luongo, A., 'Quantum classification of the MNIST dataset via Slow Feature Analysis', 2018, Cornell University Library, pp. 1-25, arXiv:1805.08837v2.
Cornelissen, A.J., 'Quantum gradient estimation and its application to quantum reinforcement learning', 2018, Master Thesis, Delft University of Technology, pp. 1-178, URL:http://resolver.tudelft.nl/uuid:26fe945f-f02e-4ef7-bdcb-0a2369eb867e.
Prakash, A., 'Quantum Algorithms for Linear Algebra and Machine Learning', 2014, University of California at Berkeley,, pp. 1-91, https://digitalassets.lib.berkeley.edu/techreports/ucb/text/EECS-2014-211.pdf.
Claver, J.M., Mollar, M., Hernandez, V., 'Parallel Computation of the SVD of a Matrix Product', 1999, Serious Games, Springer International Publishing, vol. 1967, pp. 388-395, DOI:10.1007/3/540-48158-3_48.

* cited by examiner

METHOD OF CLASSIFICATION OF IMAGES AMONG DIFFERENT CLASSES

CROSS-REFERENCE TO RELATED APPLICATIONS

This specification is based upon and claims the benefit of priority from European patent application number EP 18306859.2 filed on Dec. 27, 2018, the entire contents of which are incorporated herein by reference.

FIELD OF THE INVENTION

The invention relates to methods of classification of images among different classes of images.

BACKGROUND OF THE INVENTION

Machine learning is focused on creating new algorithms based on probability theory and statistics to perform tasks such as classification or regression. Classification is the task of assigning a label to an unseen data point given a training set of previously classified elements. Regression is the task of learning an unknown function from a set of points sampled from the function. Pattern recognition is one of the most established approaches to classification, and image classification is one of the most studied applications of pattern recognition.

The majority of algorithms in machine learning rely on an embedding between the data analyzed and a mathematical structure, like a vector space. Quantum mechanics is a theory that models with mostly linear algebra the behavior of particles at the smallest scales of energy. It is believed that quantum computers can offer an exponential speedup in terms of data processing capabilities.

The aim of the invention is to set up a method to perform classification using in some intermediate steps a quantum computer. In order to prove the validity of this approach, this procedure will be executed on a dataset of handwritten digits, where it will be managed to reach up to 98% accuracy. The method of classification of image among classes contemplated by the invention can either be performed directly via the computation described in the algorithm, or via simulation with classical computer of the operations that the quantum computer is supposed to run.

A big issue in image classification is the curse of dimensionality. Informally, the curse of dimensionality states that the number of data points in the training set should increase exponentially with the dimension of the space embedding the elements. This is because in big spaces the informative power of a single point decreases, and thus a bigger training set is needed. Since is not always possible to acquire, store, or process such number of vectors, one of the known solution is to perform a dimensionality reduction therefore, i.e. moving the vectors from a high dimensional space to a lower dimensional space, but while keeping as much as information as possible.

Therefore, algorithms for doing dimensionality reduction before classification have emerged. These algorithms often use linear algebra, and the operation that they often need in the algorithms are matrix inversion and matrices multiplication. Given the size of these datasets, these operations are computationally demanding even for supercomputers. More clever techniques to process the data are needed. Therefore, according to the invention, quantum computers offer alternatives to the paradigm of classical computation also for the method of classification of images among different classes. The invention will use quantum singular value estimation procedures to build the subroutine that performs the dimensionality reduction. Quantum interference is used to perform classification with high accuracy and efficiently.

There are classical algorithms for classification and dimensionality reduction and classification. For instance PCA is a known DR algorithm that projects the dataset in the subspace that holds most of the information of the original data, but it lacks the ability to take into consideration the shape of the clusters. Linear fisher discriminant is a classical algorithm that partly solves this problem, by taking into consideration the variance of each cluster, and projecting over a subspace that maximize the distance between clusters in the projected points.

There are also classical algorithms to perform pattern matching and image classification, before or after dimensionality reduction. For instance, a current paradigm is that of neural networks, where a layer of artificial neurons are connected by edges with certain weights, and the weights are adjusted such that the neural network mimics the desired input-output mapping described by the elements in the dataset.

Other solutions proposed so far are meant to be executed on classical computer, and thus, the running time needed to train the classifier cannot be less than linear in the dimension of the vectors and the initial input space that encodes the features. Due to the complexity of matrix inversion and matrices multiplication, the running time of the classical algorithms between the square and the cube of the dimension of the matrices, thus the time needed to run these procedures raises drastically with the amount of data produced nowadays.

Current quantum algorithms for machine learning are not targeted on image classification and are based on more trivial procedure that do not involve performing linear algebraic operations performed on quantum computers, thus the invention represents an unprecedented innovation in the field of quantum machine learning.

The performances of a classification algorithm are measured using several possible metrics. One of these is classification accuracy: the percentage of correctly classified values in a set of patterns whose labels are known, but are not used in the training procedure.

SUMMARY OF THE INVENTION

The object of the present invention is to alleviate at least partly the above mentioned drawbacks.

More particularly, the invention aims to a method of classification of images among different classes which fulfills a good compromise between on the one hand its accuracy and on the other hand its rapidity. Indeed, in embodiments of the invention, the accuracy is somewhat better than in prior art, whereas the rapidity is much higher, because of by-passing very demanding calculations, and replacing them by much easier indeed faster to execute, but still sufficient indeed equivalent for the contemplated application, satisfactory calculations.

This invention is the result of the meeting of two very different technical fields which are far away from each other: the technical field of image processing on the one side, where there are many very practical problems to solve but few, if any, effective solutions to work, and the technical field of quantum circuit and quantum computer, on the other side, where there are quite amazing theoretical tools but little practical and interesting application to confirm practical interest.

Indeed:

the technical field of image processing attends to replace human know-how on image recognition and image classification which are both very difficult tasks where the human brain mysteriously easily succeeds whereas the computer, on the contrary, even when quite powerful, often seems at a loss of becoming successful in a repeated and reliable way, because:

classical computers, even high performance clusters' of classical computers, do not give very good results, even if the global capabilities of the whole cluster contemplated looks impressive, computers based on neural networks may give better results but they are not so difficult to implement, but they are quite difficult and very slow to train in an efficient way, once more all the more in a repeated and reliable way, the technical field of quantum circuit computation is a rather brand new technology, at least for practical applications, even if theory has been developed decades ago, which is fast growing, which looks like very promising in solving at least some types of rather specific calculation problems, but which is not yet fully convincing in building algorithms which can really be considered both as useful and efficient, and which would successfully solve practical and interesting problems, not only show theoretical capabilities in solving abstract and specific calculation problems thereby advantageously comparing with more classical computers.

In the application of image classification, a lot of calculations are implied.

In the core of these complex calculations, the invention has identified a particularly difficult calculating step to perform.

The invention rather proposes to by-pass this "particularly difficult calculating step" than to perform it, and to replace it by an easier calculating step practically as efficient as this "particularly difficult calculating step" in specific circumstances of implementation.

The invention proposes to implement a specific trick made possible by quantum calculation in order to by-pass a specific difficulty within the full processing of image classification.

The invention proposes that:

instead of calculating the product of two huge matrices which both matrices represent two different images and which product is required to correctly perform image classification via performing dimensionality reduction for different classes of images, these huge matrices may also represent many of such different images, first, only the eigenvalues of both these matrices are estimated, and second, the eigenvalues of the product of these matrices is directly estimated from the eigenvalues of both these matrices, without effectively calculating this product of matrices, taking into account the fact that, knowing only the eigenvalues of this product of matrices is sufficient indeed, and that, it is indeed not compulsory to effectively calculate this product of matrices in order to correctly perform image classification.

This invention may be applied more generally to other problems implying a product of two huge matrices performed within a dimensionality reduction step in any method of analysis of images other than image classification, deeming to replace human know-how in order to automate such image analysis, and to automate it in a much quicker way than the manual way.

To implement this dimensionality reduction step including a first estimation of only the eigenvalues of both these matrices and a second estimation of the eigenvalues of the product of these matrices directly performed from the eigenvalues of both these matrices and without effectively calculating this product of matrices, the invention also proposes:

a phase estimation of an entity performing some specific quantum steps, and/or a specific quantum circuit based on Hadamard gates and on inverted quantum Fourier transform components, used a specific way by successive implementations of both matrices in a quantum memory controlled by at least part of these Hadamard gates and these inverted quantum Fourier transform components.

Machine learning techniques are used in combination with quantum circuits, either deep learning or other machine learning method. This combination, between a technique offering rich tools to mimic human behavior and another technique offering huge calculating capabilities far beyond the human brain, has ended up into a very powerful efficiency while still keeping flexibility.

Neural network also could be used in combination with quantum circuits.

This object is achieved with a method of classification of images among different classes comprising: performing a dimensionality reduction step for said different classes on a training set of images whose classes are known, and then classifying one or more unknown images among said different classes with reduced dimensionality, said dimensionality reduction step being performed on said training set of images by machine learning including processing, for at least a first matrix and for at least a second matrix, a parameter representative of a product of two first and second matrices to assess to which given classes several first given images respectively belong: first matrix representing the concatenation, for said several first given images, of the values of the pixels of each said first given image, second matrix representing the concatenation, for said several first given images, of the values of differences between the pixels of each said first given image and the pixels of a second given image different from said first given image but known to belong to same class as said first given image, wherein: a quantum singular value estimation is performed on first matrix, a quantum singular value estimation is performed on second matrix, both quantum singular value estimation of first matrix and quantum singular value estimation of second matrix are combined together, via quantum calculation, so as to get at a quantum singular value estimation of said product of both first and second matrices, said quantum singular value estimation of said product of both first and second matrices being said parameter representative of said product of two first and second matrices processed to assess to which given class said first given image belongs.

This object is also achieved with a method of analysis of images comprising: performing a dimensionality reduction step, by processing, for several first matrices and for several second matrices, a parameter representative of a product of both first and second matrices respectively representing the pixels of both a first and a second images, wherein: a quantum singular value estimation is performed on first matrix, a quantum singular value estimation is performed on second matrix, both quantum singular value estimation of first matrix and quantum singular value estimation of second matrix are combined together, via quantum calculation, so as to get at a quantum singular value estimation of said product of both first and second matrices, said quantum singular value estimation of said product of both first and second matrices being said parameter representative of said product of both first and second matrices.

This object is also achieved with a method of analysis of images comprising: performing a dimensionality reduction step, by processing, for several first matrices and for several second matrices, a parameter representative of a product of both first and second matrices respectively representing the pixels of both a first and a second images, wherein: both quantum singular value estimation of first matrix and quantum singular value estimation of second matrix are estimated each and are combined together so as to get at a quantum singular value estimation of said product of both first and second matrices, by making a phase estimation of an entity at least successively performing: quantum singular value estimation of first matrix, quantum rotations, proportional to estimated singular values of first matrix, preferably quantum rotations on Y axis of Bloch sphere, proportional to estimated singular values of first matrix, quantum singular value estimation of second matrix, quantum rotations, proportional to estimated singular values of second matrix, preferably quantum rotations on Y axis of Bloch sphere, proportional to estimated singular values of second matrix, said quantum singular value estimation of said product of both first and second matrices being said parameter representative of said product of both first and second matrices.

This object is also achieved with a method of analysis of images comprising: performing a dimensionality reduction step, by processing, for several first matrices and for several second matrices, a parameter representative of a product of both first and second matrices respectively representing the pixels of both a first and a second images, wherein: both quantum singular value estimation of first matrix and quantum singular value estimation of second matrix are estimated each and are combined together so as to get at a quantum singular value estimation of said product of both first and second matrices, by applying to both first and second matrices following quantum circuit including: a first Hadamard gate whose output is the input of a first inverted quantum Fourier transform, said first Hadamard output controlling following sub-circuit, a second Hadamard gate whose output is the input of a second inverted quantum Fourier transform, said second Hadamard output controlling a quantum memory, output of said first inverted quantum Fourier transform will give said quantum singular value estimation of said product of both first and second matrices, once said quantum memory has successively contained first matrix and second matrix, said quantum singular value estimation of said product of both first and second matrices being said parameter representative of said product of both first and second matrices.

This object is also achieved with a method of analysis of images comprising: performing a dimensionality reduction step, by processing, for several first matrices and for several second matrices, a parameter representative of a product of both first and second matrices respectively representing the pixels of both a first and a second images, wherein: both quantum singular value estimation of first matrix and quantum singular value estimation of second matrix are estimated each and are combined together so as to get at a quantum singular value estimation of said product of both first and second matrices, by making a phase estimation of an entity at least successively performing: quantum singular value estimation of first matrix, quantum rotations, proportional to estimated singular values of first matrix, preferably quantum rotations on Y axis of Bloch sphere, proportional to estimated singular values of first matrix, quantum singular value estimation of second matrix, quantum rotations, proportional to estimated singular values of second matrix, preferably quantum rotations on Y axis of Bloch sphere, proportional to estimated singular values of second matrix, while applying to both first and second matrices following quantum circuit including: a first Hadamard gate whose output is the input of a first inverted quantum Fourier transform, said first Hadamard output controlling following sub-circuit, a second Hadamard gate whose output is the input of a second inverted quantum Fourier transform, said second Hadamard output controlling a quantum memory, output of said first inverted quantum Fourier transform will give said quantum singular value estimation of said product of both first and second matrices, once said quantum memory has successively contained first matrix and second matrix, said quantum singular value estimation of said product of both first and second matrices being said parameter representative of said product of both first and second matrices.

Preferably, it is a method of classification of images among different classes and: said dimensionality reduction step is performed for said different classes on a training set of images whose classes are known, and then classifying one or more unknown images among said different classes with reduced dimensionality, said dimensionality reduction step being performed on said training set of images by machine learning including processing, for at least a first matrix and for at least a second matrix, a parameter representative of a product of two first and second matrices to assess to which given classes several first given images respectively belong: first matrix representing the concatenation, for said several first given images, of the values of the pixels of each said first given image, second matrix representing the concatenation, for said several first given images, of the values of differences between the pixels of each said first given image and the pixels of a second given image different from said first given image but known to belong to same class as said first given image.

Preferred embodiments comprise one or more of the following features, which can be taken separately or together, either in partial combination or in full combination, in combination with any of preceding objects of the invention.

Preferably, operation of said combination of both quantum singular value estimation of first matrix and quantum singular value estimation of second matrix together, via quantum calculation, so as to get at a quantum singular value estimation of said product of both first and second matrices, is used to replace either an operation of matrices multiplication and/or an operation of matrix inversion on matrices multiplication.

This method of image classification according to the invention, is particularly efficient and useful to replace some calculations which would otherwise remain very hard and complex operations, among which there are first matrices multiplication and second matrix inversion.

Preferably, said values of the pixels of first given image represent values of levels of gray, advantageously over a range of 256 values, said values of differences between the pixels of first given image and second given image represent values of levels of gray, advantageously over a range of 256 values.

This method of image classification according to the invention, is quite useful to detect images having a complicated and intricate shape which does not look any easier or simpler even when the image is digitalized.

Preferably, said first images are handwritten digits, said classes are the different possible digits, said method of classification performs an automatic recognition of handwritten digits.

This method of image classification according to the invention, can find a specific application which is very interesting, where it would be otherwise hard to get at a good result which would remain reliable, whatever the specific set of images to be classified, such images to be classified still remaining within the boundaries of a given category of images.

Preferably, said first matrix includes one of said several given first images per line, or said first matrix includes one of said several given first images per column.

Preferably, said first image is itself the concatenation of several images, advantageously one image per line or per column, said second image is itself the concatenation of several images, advantageously one image per line or per column.

Preferably, said first images are concatenations of handwritten digits, said classes are the different possible digits, said method of classification performs an automatic recognition of handwritten digits.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
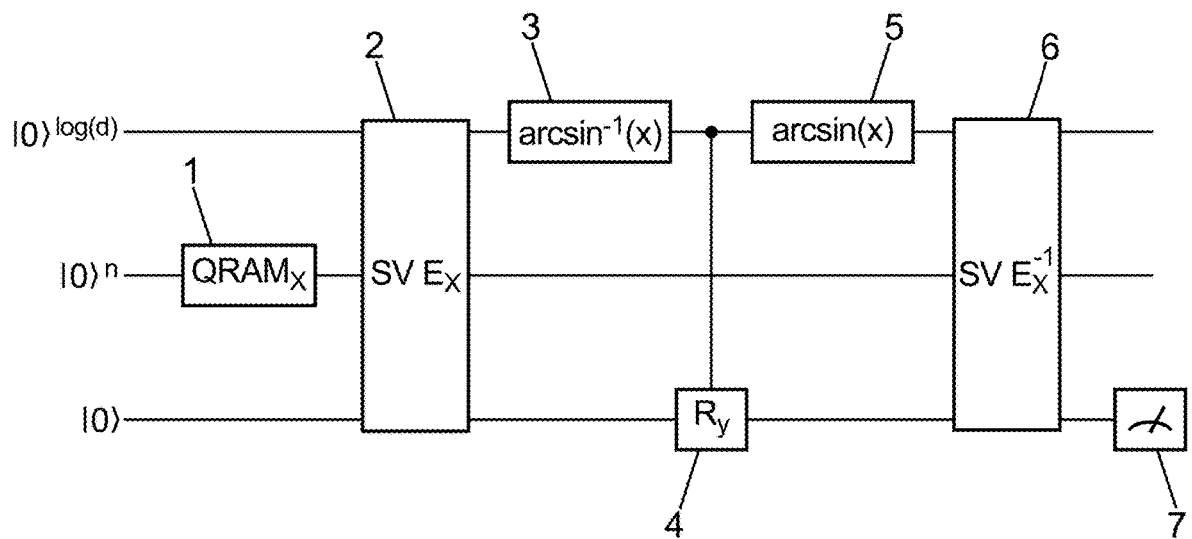
FIG. 1 shows an example of a block diagram representing a quantum subroutine called UW used in a method of classification of images among different classes according to an embodiment of the invention.

Qubit or qbit will be indifferently used throughout whole text, it means a quantum bit.

The quantum computation performed is a single-parameter quantum procedure that performs the dimensionality reduction. The procedure to assign a label to the images uses quantum algorithms to perform the dimensionality reduction and classification. The preprocessing time is linear in the dimensionality of the dataset, but the time used for classification performances is polylogarithmic, and thus is exponentially more efficient than the other classical algorithms according to prior art. The procedure described is parameterized by a value theta, a parameter that depends on a given dataset. It will also be explained how to estimate theta for a given dataset in the procedure.

This is the setting that is considered: an assumption is made to have a dataset of N images with L different labels to classify, and a new image with unknown label. The correct label for the new image has to be found. The quantum algorithm for dimensionality reduction uses a recent scientific breakthrough, called singular value estimation. This algorithm allows for building a superposition of the singular values of a given matrix stored in QRAM in time poly logarithmic in the matrix dimension.

The following procedure uses a quantum computer to execute the operations on step number 4. This quantum procedure will use a data structure called QRAM that is described in Kerenidis2016 [Kerenidis, Iordanis, and Anupam Prakash. 2017. "Quantum gradient descent for linear systems and least squares," April. http://arxiv.org/abs/1704.04992] hereby incorporated by reference. A QRAM is a data structure where the quantum computer can have quantum access, and is the device used to input data in a quantum computer.

Successive steps 1 to 10 will now be described, with sub-steps a,b,c for some of them, and sub-sub-steps i,ii,iii, etc. . . . for some of them.

1. Collection the elements to be used as training set. This step is important, as the elements in the dataset should resemble as much as possible the elements that the system will have to classify when executed. Possibly, they should not have misclassified elements; otherwise the performance of the classifier may be affected.

2. Standardize the pattern collected and extract the most salient features of the images that are relevant for classification.

a. Center in the picture the subject in the image under classification, and then reduce all the images to the same size.

b. If there are reasons to believe that the relevant part to identify the image consist in its shape and not its color, it may be decided to convert the image in black and white, in this way, reducing the amount on information elaborated we reduce further the overall complexity of the task.

c. In case the images are highly complex and contain many objects, it can be decided to employ techniques of feature extraction for this type of data, like edge detection, corner detection, and blob detection.

3. In case the digital representation of the patterns in the previous steps was a sparse matrix (and therefore stored in memory using different techniques), converted the pattern into a vector of floating point value. For an image, this can be done by juxtaposing the columns one by one.

4. This vector is then eventually polynomially expanded (usually a polynomial of degree 2 or 3 suffices)

5. Each vector is normalized by removing the mean of the vectors in the training set.

6. Each component is scaled such that it has unitary variance.

7. The dataset is stored into QRAM which is called QRAM for X.

8. Then a new QRAM with samples of the pairwise derivatives of the data is constructed. This matrix is called matrix X_dot. Take a number of samples that is at least linear in the number of elements in the dataset X.

9. To perform the dimensionality reduction and also the classification on a quantum computer, follow step a, otherwise, to perform the classification on a classical computer, go to step b.

a. For each class in the training set, use the quantum computer to perform $U_{DR}$: the dimensionality reduction on the sample to classify and a cluster of choice. Specifically:

i. Start with two empty registers and apply an Hadamard on the first register.

ii. Controlled on the first register being zero, create a state proportional to the training set of the class currently selected, and the new vector. This can be done by doing a query to the QRAM of X once. Controlled on the first register being one, create a state with multiple copies of the test vector under classification. The number of copies is the same as the element in the class currently under testing.

iii. Then use $U_W$ on the state which has been created. The operation $U_W$ uses queries to the QRAM of X and ancillary registers.

iv. Now execute $U_P$ on the state created in the previous step. $U_P$ uses query to QRAM of X, queries to $U_L$, and ancillary registers.

v. Use an Hadamard to create quantum interference on the data register. Repeat these steps and estimate the probability of reading 0 in the first register.

vi. Perform the necessary estimation of normalization factor, as described in the following paragraph.

b. In case it is wanted to use other classification subroutines on a classical computer, the following can be done:

i. Run $U_{DR}$ on each element of the training set and then on the new element to classify. Perform quantum tomography on the final state in the quantum computer. This will allow for recovering a vector of a small dimension.

ii. Once all the dataset is recovered and stored on classical storage (like classical RAM or a hard drive) choose the classification procedure:

If wanting to favor speed over accuracy, calculate the distance between the barycenter of each cluster and the test vector to classify. Assign as label of the new vector under classification the label of the cluster whose barycenter is closer. This is the same procedure that can be executed on the quantum computer, and leads to the same classification accuracy.

If preferring more accurate result and if willing to spend more time in the procedure, do the following. For a given integer k (like 5), find the k closest elements in the training set to your test vector. Label the new vector with the label that is most frequent among the k nearest neighbors.

iii. Keep the training set in the classical storage, along with the information of the barycenter of the clusters. If wanting to classify further elements in the dataset, run $U_{DR}$ on the new elements and run again the computation of distance on a classical computer.

10. Once the system to perform classification is ready, there is still the task dealing with the problem of finding an estimate for the parameter theta. This can be done by repeating the classification procedure with various values of theta from 0 to 1 and doing binary search over the parameter space. The parameter is meant to be found experimentally, and change with different dataset. It can be estimated running the procedure several times for N possible values between 0 and 1 uniformly. Until the desired accuracy is got, split the interval with biggest classification accuracy into N other intervals, and find the new theta value for which the biggest accuracy is got. This procedure guarantees to find the best possible tetha with the desired accuracy efficiently.

At the end of the quantum computation, the register holds the data of the training data moved in a small dimensional space. A classification procedure can be suggested which will be based on the estimate of the average of the distances between a test point to classify and the center of each cluster. There can be noted that during the computation, the registers of the quantum computers store all the dataset in superposition, thus allowing the simultaneous application of the operation on all the vectors. Since the operations inside the quantum computer are inherently randomized, due to the probabilistic nature of quantum mechanics, techniques such as amplitude amplification can be used to further decrease the runtime of the classification.

FIG. 1 shows an example of a block diagram representing a quantum subroutine called UW used in a method of classification of images among different classes according to an embodiment of the invention.

A QRAM of X 1 is connected to an input of a SVE 2 of X. A first output of SVE 2 is connected to the input of an inverted arcsine function 3 whose output is connected to an arcsine function 5 and controls a Y rotation 4. A second output of SVE 2 is directly connected to a second input of an inverted SVE 6 of X. Y rotation 4 is connected between a third output of SVE 2 and a third input of inverted SVE 6. A qubit measure 7 is performed on third output of inverted SVE 6.

This procedure takes as input a quantum register and two ancillary register, and output a quantum register. It uses multiple calls to the QRAM of X. Following steps 1 to 5 will be successively performed:

1. Perform Singular Value Estimation (as in Kerenidis2016 already incorporated by reference) to write in a register the singular values of the matrix X in superposition.

2. Then, by using arithmetic operations on quantum register, exploit the symmetry of trigonometric functions to map each singular value in its inverse. This can be done using a library for arithmetic operations on a quantum computer.

3. Execute a Y rotation over an ancillary qubit controlled on the register created in the previous step.

4. Execute the inverse of the trigonometric function and the inverse of the circuit used to perform SVE (singular value estimation) on X, in this way the quantum register used to store the superposition of singular values is emptied.

5. Optionally, measure the ancilla qubits until 0 is read. In case 1 is read, repeat the procedure. This step can be postponed to the end of the quantum program. This will allow for applying techniques of amplitude amplification to speedup even further the estimation of the final result, which is contained in the middle register.

Figure 2:
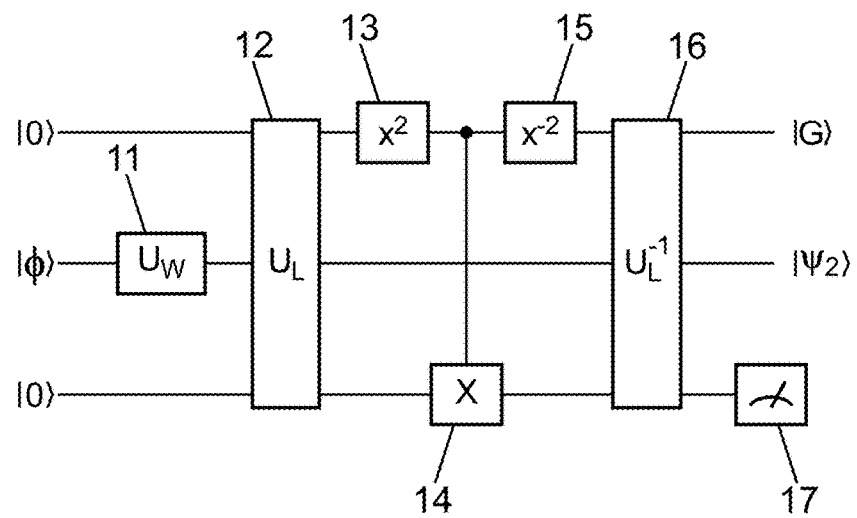
FIG. 2 shows an example of a block diagram representing a quantum subroutine called UP used in a method of classification of images among different classes according to an embodiment of the invention.

FIG. 2 shows an example of a block diagram representing a quantum subroutine called UP used in a method of classification of images among different classes according to an embodiment of the invention.

The quantum subroutine UW 11 of FIG. 1 is connected to an input of quantum subroutine UL 12 which will be described in FIG. 3. A first output of quantum subroutine UL 12 is connected to the input of a square function of X 13 whose output is connected to an inverted square function of register X 15 and controls X referenced 14. A second output of subroutine UL 12 is directly connected to a second input of an inverted subroutine UL 16. Register X 14 is connected between a third output of subroutine UL 12 and a third input of inverted subroutine UL 16. A qubit measure 7 is performed on third output of inverted subroutine UL 16.

This procedure takes as input a quantum register and two ancillary register, and output a quantum register. Following steps 1 to 5 will be successively performed:

1. Use $U_L$ to store in a quantum register the singular values of the matrix in superposition.
2. Using a quantum linear algebra library, square the values of the first register, as shown in the image.
3. Execute a controlled negation gate over an ancillary qubit parameterized by theta.
4. Execute the inverse of the square of the first register and the inverse of $U_L$, in this way the quantum register used to store the superposition of singular values will be emptied.
5. Optionally, measure the ancilla qubits until we 0 is read. In case 1 is read, repeat the procedure. This step can be postponed to the end of the quantum program. This will allow for applying techniques of amplitude amplification to speedup even further the estimation of the final result, which is contained in the middle register.

Figure 3:
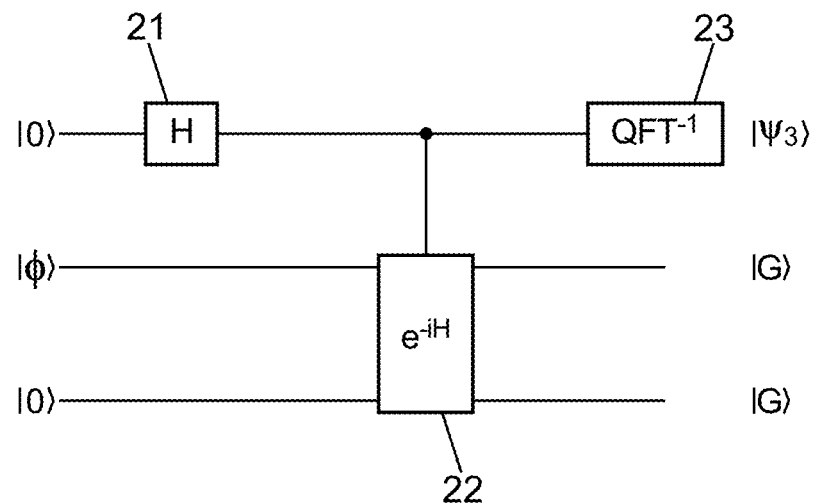
FIG. 3 shows an example of a block diagram representing a quantum subroutine called UL used in a method of classification of images among different classes according to an embodiment of the invention.

FIG. 3 shows an example of a block diagram representing a quantum subroutine called UL used in a method of classification of images among different classes according to an embodiment of the invention.

Output of an Hadamard 21 is connected to input of an inverted Quantum Fourier Transform 23 (QFT) and controls a quantum subroutine called $e^{(iH)}$ 22 which will be described below in more details through following sub-steps 2.1 to 2.3.

This step is used to create a quantum register with the superposition of the singular values of the product of two matrices X and X_dot, having them stored in QRAM. This procedure takes as input a quantum register, and two ancillary register. It is to be noted that, since calculating the singular values of the product of two matrixes has never been done before, this represents an unprecedented step that no one has ever done before on a quantum computer. This new step is an effort combining previous results in quantum information, using phase estimation and singular value estimation algorithms. Following steps 1 to 3 will be successively performed:

1. Create, using an Hadamard, a uniform superposition of elements in an index register. Use this register to perform phase estimation as such.
2. Controlled on the index register, do the following unitary:
  2.1. Apply a Hadamard gate in order to create a uniform superposition of values on another register.
  2.2. Controlled on the second index register, execute on a new register SVE on X and controlled operation to apply the matrix X to the quantum state, and execute on a new register SVE on X_dot and controlled operation to apply the matrix X_dot on the state.
  2.3. Perform amplitude amplification on 0 on the second index register.
3. Perform an inverse QFT on the first register.

In the image that represents the quantum circuit, steps 2.1 to 2.3 are executed inside the controlled unitary matrix that is called $e^{(iH)}$ 22.

To be more precise and more detailed about what is done in quantum subroutine UL and in the controlled unitary matrix that is called $e^{(iH)}$ 22, here are some complementary explanations.

Performing "controlled operations" means that there are two register: A and B. Generically, an operation on the register B is performed if the register A is in a certain state. Since the register A is in a superposition of states, multiple operations are performed on the second register as well.

For doing quantum subroutine UL, following operations are done:

On the first register the superposition (with Hadamard matrix) of all the numbers from 0 to some integer N is created. Then, controlled on this register, all the following operations are done:
  apply the first matrix,
  apply the second matrix,
  Then, perform the $QFT^{-1}$ (inverted Quantum Fourier Transform) to read (magically) the singular values of the product of the two matrices stored in QRAM.

"apply the matrix" means the following steps:
  perform singular value estimation to write the eigenvalues of a matrix in a new register,
  add a new ancilla qubit,
  perform a rotation on the Y axis on the ancilla qubit controlled on the register that has the superposition of singular values. The rotation is proportional to the singular value written in the register. Since there are many of them (it is a superposition), basically more controlled rotations are performed "at the same time".
  perform the inverse of singular value estimation to empty the register with the singular values. The Y axis is really the Y axis in X,Y,Z axis of a 3-Dimensional sphere that represents the qubit, which is also called the Bloch Sphere . . . it would also be possible to perform other controlled rotations than Y controlled rotations instead.

Figure 4:
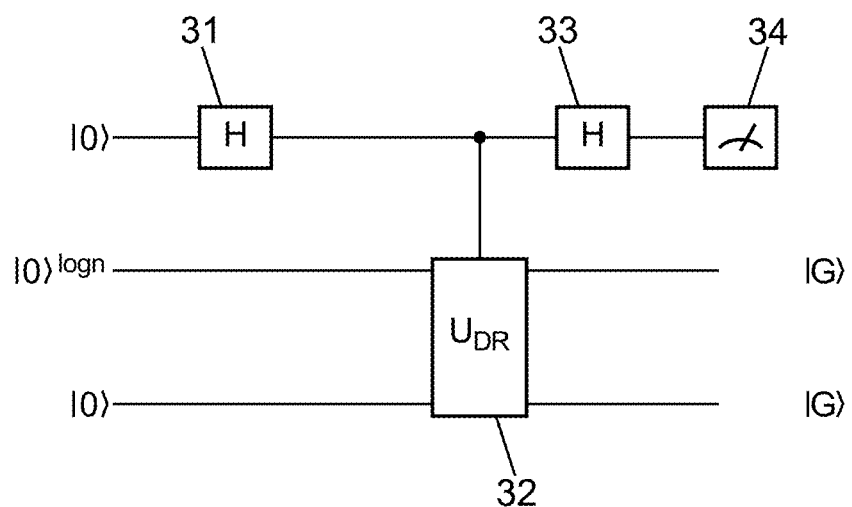
FIG. 4 shows an example of a block diagram representing a quantum subroutine called UD used in a method of classification of images among different classes according to an embodiment of the invention.

FIG. 4 shows an example of a block diagram representing a quantum subroutine called UD used in a method of classification of images among different classes according to an embodiment of the invention.

Output of an Hadamard 31 is connected to input of an Hadamard 33 and controls a quantum subroutine UDR 32 which will be described below in more details. There is a qubit measure 34 performed on output of Hadamard 33.

Now, quantum subroutine $U_D$ and its use in classification will be described.

This procedure uses access to a $U_{DR}$ oracle, a QRAM access to the vectors of K different clusters, and ensures a label for a new unclassified vector. The pattern is labeled with the label of the class with minimum average squared distance. This probability is proportional to the square average distance of the test vector and the cluster of points. Following steps 1 to 4 are performed to estimate the average squared distance.

1. For each different class in the dataset:
  1.1. Start with a qubit in state 0 and perform an Hadamard over it.
  1.2. Perform a controlled operation on this qubit. If the state is zero, perform $U_{DR}$ on the data of the cluster currently chosen. If in the state 1, use $U_{DR}$ to create a state proportional to the vector under classification.
  1.3. Perform a Hadamard on the ancilla qubit to create quantum interference.
2. Repeat this procedure from Step 1 until it is estimated with the desired accuracy the probability that 0 is read in the ancilla qubit.
3. Estimate the necessary normalization values of the quantum state used in this procedure. This can be done in the following way. Put a qubit in 0 state and apply an Hadamard on it.

Controlled on the ancilla register being 0, use $U_{DR}$ on all the elements with a given label.

Controlled on the ancilla register being 1, create a superposition whose amplitude is proportional to a known value (i.e. the norm of a single vector).

From the probability of measuring 0 in the ancilla qubit the normalization factors can be recovered.

4. Assign the new vector to the cluster with minimum score. The score is proportional to the product between the normalization values and the probability of reading zero in the procedure described above.

Figure 5:
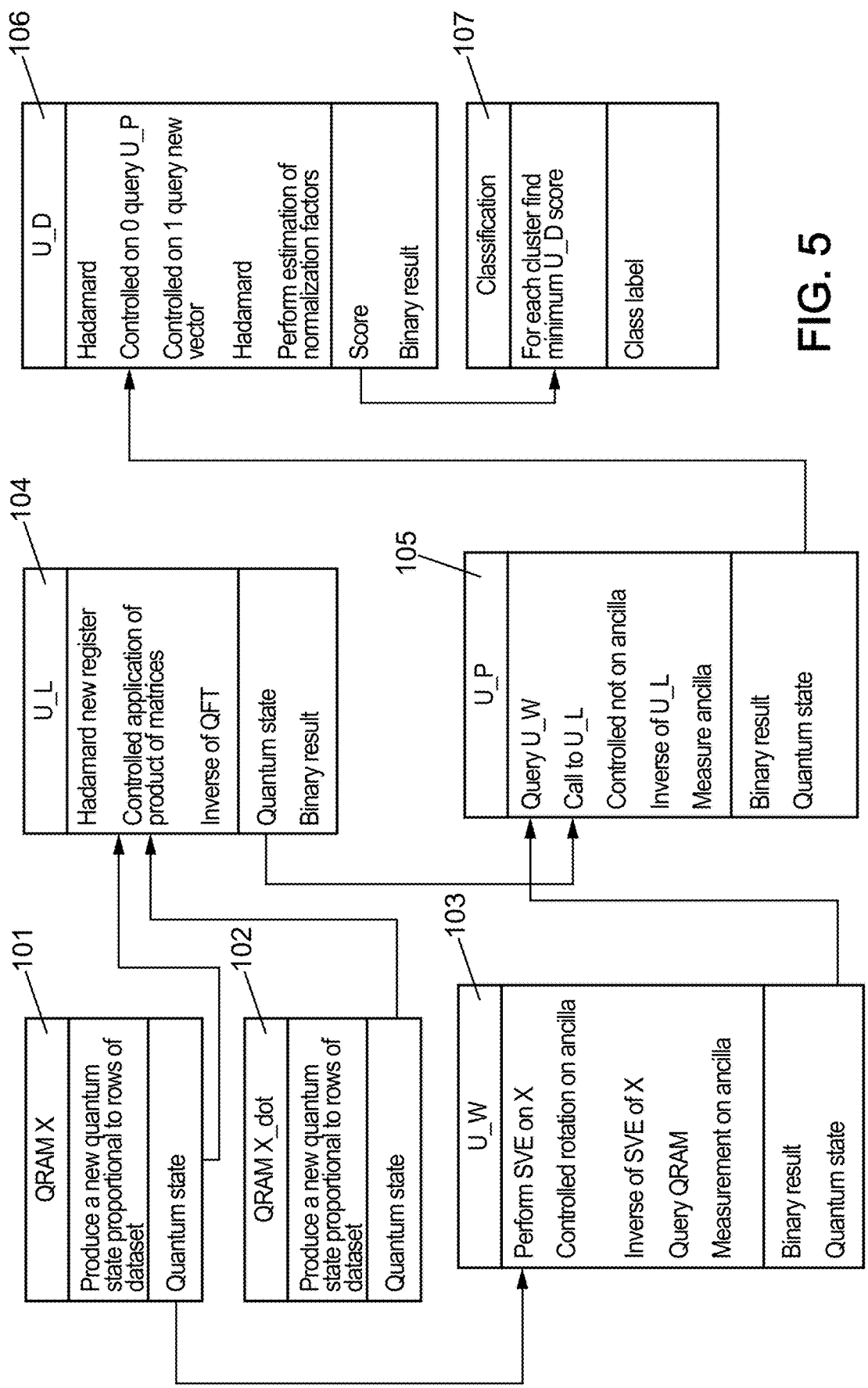
FIG. 5 shows an example of a block diagram representing the relationships existing between the different quantum subroutines used in a method of classification of images among different classes according to an embodiment of the invention.

FIG. 5 shows an example of a block diagram representing the relationships existing between the different quantum subroutines used in a method of classification of images among different classes according to an embodiment of the invention.

QRAM of X 101 is used by quantum subroutine UW 103 and by quantum subroutine UL 104. QRAM of X_dot 102 is used by quantum subroutine UL 104. Quantum subroutine UW 103 is used by quantum subroutine UP 105. Quantum subroutine UL 104 is used by quantum subroutine UP 105. Quantum subroutine UP 105 is used by quantum subroutine UD 106. Quantum subroutine UD 106 is used by classification processing 107.

On FIG. 5, there is the description of the relationship between the quantum operations which are executed on the quantum computer. Due to the nature of quantum computers, each step might use multiple oracle calls to other subroutines. For instance, the quantum circuit that is named $U_L$ is used inside the subroutine that is named $U_P$. The quantum circuit that is named $U_W$ is used only inside the quantum circuit $U_P$. The subroutine used to calculate score used to perform classification ($U_D$) calls $U_P$ for each label in the dataset. The two oracles (called QRAM in quantum machine learning context) for X and for X_dot are used both to create the quantum states that represent the data, and inside the function calls of singular values estimation that are used inside $U_L$ and $U_W$.

Now a specific example will be described in more details.

Public datasets represent a pool of standard benchmarking for classification algorithms. The previous procedure was tested with classical software that simulates the quantum procedure, and tested against the MNIST dataset of handwritten digits. This dataset is freely available and distributed online and is the first choice for testing classification algorithms. It is a set of 60.000 handwritten digits for the training set, and other 10.000 of the test set. Several machine learning algorithms are benchmarked against the MNIST dataset. For a list of the performance of various classification algorithms applied to MNIST dataset, one can refer to LeCun [LeCun, Yann. n.d. "The MNIST database of handwritten digits." Http://Yann. Lecun. dCom/Exdb/Mnist/.] hereby incorporated by reference. The previous procedure thus finds implementation on real data in the following steps 1 to 9:

1. Then, the data is read in memory in a suitable representation of vectors, specifically of floating point numbers with 64 bits of precision.

2. In the MNIST dataset, the images are already in black and white, and they appear in center of a tile of 28×28 pixel.

3. The image is converted into its vector representation as list of floating point's numbers.

4. Then, the data is preprocessed:
 a. Normalized such that the average of each component of the vector is 0.
 b. Scaled such as the variance of each component of the vector is 1

5. The preprocessed data represented by a matrix X is then stored in our quantum software representing a QRAM for the matrix X.

6. Samples from the derivatives of the normalized dataset are taken, forming the second matrix X_dot. This data is stored in the second software representation of a QRAM.

7. The simulation of the operation performed by the quantum circuits is performed. In this embedding, there is a simulation of the linear-algebraic operation of quantum mechanics, explicitly adding the error committed during the quantum algorithm due to noise.

8. After the quantum procedure, the data is represented as quantum state in a small dimensional space where classification can be performed efficiently.

9. Simulation of the same classification rule that was described in the classification step of the quantum computer and collected the statistics to measure the classification accuracy is performed.

This has shown execution on a real data to prove high accuracy of classification procedure.

This is an important key for claiming that this realized procedure that uses quantum computer works in practice. In order to claim that the procedure will work on real quantum computers, it was interesting to show that the error in the precision of the calculation that was committed in the various operations on the quantum computer will not hinder the classification accuracy. To do this, there was a simulation of the quantum subroutines using a classical computer, inserting the same error committed during the quantum procedures. The errors are due to the singular value estimation step of the matrix X in $U_W$, and in the subroutine $U_P$. To measure the impact of these errors, there was artificially inserted error in the classical simulation as follows:

a. Inserting Gaussian noise in the estimate of the singular values in SVE of matrix X in step $U_W$.

b. Error in the controlled rotation performed in the unitary $U_P$. Putting an error in this step will imply a less precise dimensionality reduction; therefore the data is projected in a slightly bigger subspace than expected.

The error can expressed as the accuracy required in performing the previous operation, has been chosen in this simulation to be coherent with the expected performances on the hardware of quantum computers: there is an assumption to be precise up to the sixth significant digits in these calculations.

Figure 6:
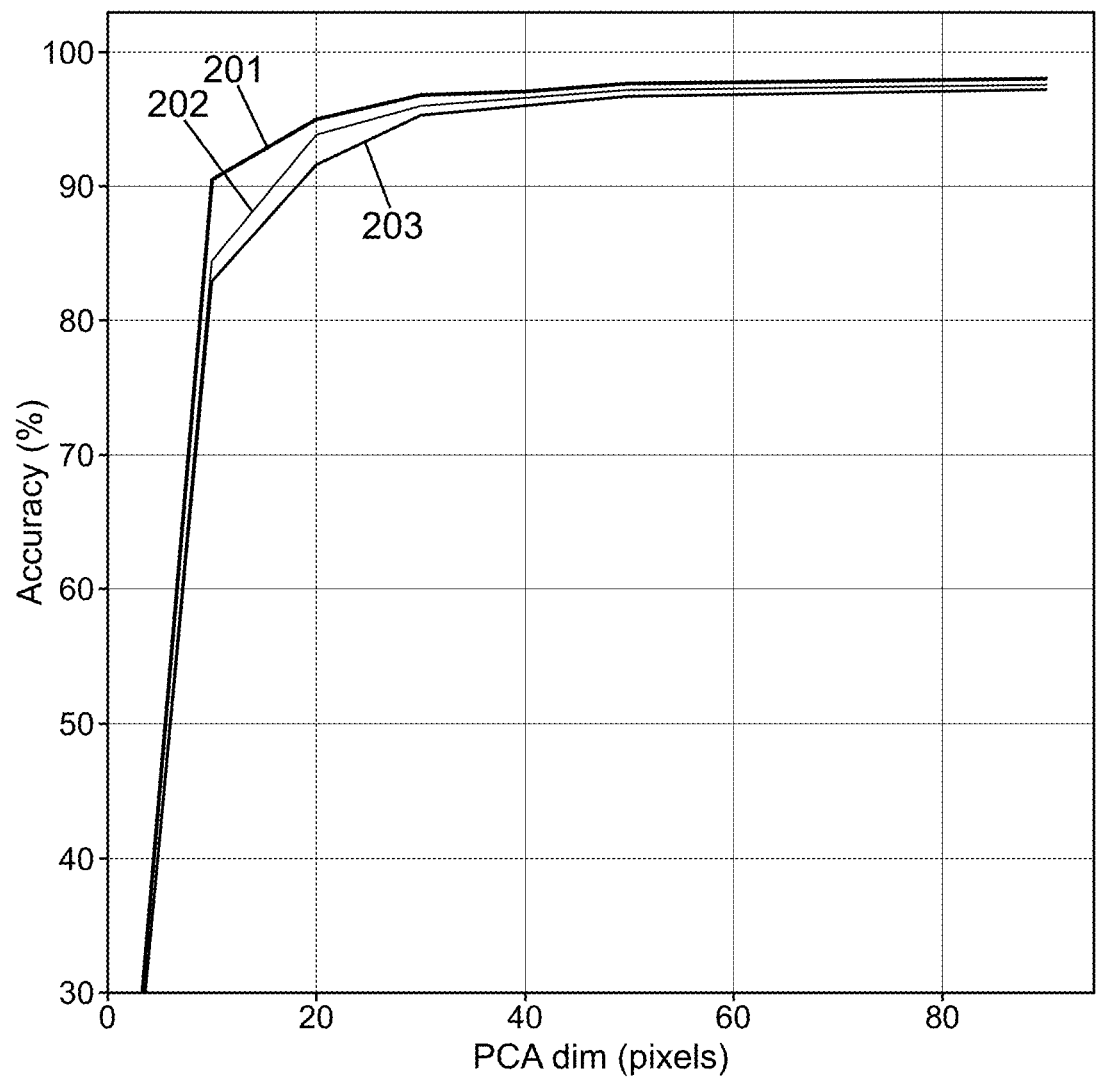
FIG. 6 shows an example of different curves comparing the respective performances of different image classification methods, including an example of a method of classification of images among different classes according to an embodiment of the invention.

FIG. 6 shows an example of different curves comparing the respective performances of different image classification methods, including an example of a method of classification of images among different classes according to an embodiment of the invention.

The experiments with the performance accuracy with and without the errors are described in FIG. 6. Along the horizontal axis there are various values of PCA dimensionality reduction of the initial dataset. This step is used to study how performance of a classifier might vary by changing the quality of the data. In this case, it is also used to decrease the size of the dataset such that is possible to perform with classical computer a simulation of the quantum algorithm, that would have not been possible otherwise. On the vertical axes, the accuracy of the classification algorithm measured in terms of percentage of misclassified images in the test set. The graph plots the classification accuracy made using three different procedures.

The curve 201 is plotted using the state of the art framework and techniques for doing classification. It is obtained using purely classical software.

The curve 202 shows the accuracy of the classification performed using quantum computers assuming operations up to 6 digits of precision in the simulation of the quantum operations can be performed, with a first type of preprocessing.

The curve 203 shows the accuracy of the procedure using quantum computer with a second type of preprocessing.

From the FIG. 6, it is possible to see that all the curves 201 to 203 eventually converge around 97% with an initial polynomial expansion of 2. Classical algorithms perform better with small dimension of the dataset, but the execution time is sensibly slower on big datasets.

The invention has been described with reference to preferred embodiments. However, many variations are possible within the scope of the invention.

The invention claimed is:

1. A method of analysis of images comprising:
performing a dimensionality reduction step,
    oby processing, for at least a first matrix and for at least a second matrix, a parameter representative of a product of both first and second matrices respectively representing the pixels of both a first and a second images,
wherein:
a quantum singular value estimation is performed on first matrix,
a quantum singular value estimation is performed on second matrix,
both quantum singular value estimation of first matrix and quantum singular value estimation of second matrix are combined together, via quantum calculation, so as to get at a quantum singular value estimation of said product of both first and second matrices,
said quantum singular value estimation of said product of both first and second matrices being said parameter representative of said product of both first and second matrices.

2. The method of classification of images among different classes according to claim 1, wherein:
said dimensionality reduction step is performed for said different classes on a training set of images whose classes are known, and then one or more unknown images are classified among said different classes with reduced dimensionality,
said dimensionality reduction step being performed on said training set of images by machine learning including processing, for at least a first matrix and for at least a second matrix, a parameter representative of a product of two first and second matrices to assess to which given classes several first given images respectively belong:
    ofirst matrix representing the concatenation, for said several first given images, of the values of the pixels of each said first given image,
    osecond matrix representing the concatenation, for said several first given images, of the values of differences between the pixels of each said first given image and the pixels of a second given image different from said first given image but known to belong to same class as said first given image,
and wherein said quantum singular value estimation of said product of both first and second matrices being said parameter representative of said product of two first and second matrices processed to assess to which given classes said several first given images respectively belong.

3. The method of classification of images according to claim 2, wherein:
said first matrix includes one of said several given first images per line,
or said first matrix includes one of said several given first images per column.

4. The method of classification according to claim 2, wherein:
said first images are handwritten digits,
said classes are the different possible digits,
said method of classification performs an automatic recognition of handwritten digits.

5. The method of analysis of images according to claim 1, wherein:
said first image is itself the concatenation of several images, advantageously one image per line or per column,
said second image is itself the concatenation of several images, advantageously one image per line or per column.

6. The method of analysis of images according to claim 1, wherein the method performs classification of images among different classes and wherein:
said dimensionality reduction step is performed for said different classes on a training set of images whose classes are known, and then classifying one or more unknown images among said different classes with reduced dimensionality,
said dimensionality reduction step is performed on said training set of images by machine learning including processing, for at least a first matrix and for at least a second matrix, a parameter representative of a product of two first and second matrices to assess to which given classes several first given images respectively belong:
    ofirst matrix representing the concatenation, for said several first given images, of the values of the pixels of each said first given image,
    osecond matrix representing the concatenation, for said several first given images, of the values of differences between the pixels of each said first given image and the pixels of a second given image different from said first given image but known to belong to same class as said first given image.

7. The method of classification according to claim 1, wherein:
operation of said combination of both quantum singular value estimation of first matrix and quantum singular value estimation of second matrix together, via quantum calculation, so as to get at a quantum singular value estimation of said product of both first and second matrices, is used to replace either an operation of matrices multiplication and/or an operation of matrix inversion on matrices multiplication.

8. The method of classification according to claim 1, wherein:
said values of the pixels of first given image represent values of levels of gray, advantageously over a range of 256 values,
said values of differences between the pixels of first given image and second given image represent values of levels of gray, advantageously over a range of 256 values.

9. The method of classification according to claim 1, wherein:
said first images are concatenations of handwritten digits,
said classes are the different possible digits,
said method of classification performs an automatic recognition of handwritten digits.

10. The method of analysis of images comprising:
performing a dimensionality reduction step,
- oby processing, for several first matrices and for several second matrices, a parameter representative of a product of both first and second matrices respectively representing the pixels of both a first and a second images, wherein:
both quantum singular value estimation of first matrix and quantum singular value estimation of second matrix are estimated each and are combined together so as to get at a quantum singular value estimation of said product of both first and second matrices, by making a phase estimation of an entity at least successively performing:
- oquantum singular value estimation of first matrix,
- oquantum rotations, proportional to estimated singular values of first matrix,
- oquantum singular value estimation of second matrix,
- oquantum rotations, proportional to estimated singular values of second matrix, said quantum singular value estimation of said product of both first and second matrices being said parameter representative of said product of both first and second matrices.

11. The method of claim 10, wherein the step of performing quantum rotations proportional to estimated singular values of first matrix is performed as quantum rotations on Y axis of Bloch sphere, proportional to estimated singular values of first matrix.

12. The method of claim 11, wherein the step of performing quantum rotations, proportional to estimated singular values of second matrix is performed as quantum rotations on Y axis of Bloch sphere, proportional to estimated singular values of second matrix.

13. The method of claim 10, wherein the step of performing quantum rotations, proportional to estimated singular values of second matrix is performed as quantum rotations on Y axis of Bloch sphere, proportional to estimated singular values of second matrix.

14. A method of analysis of images comprising:
performing a dimensionality reduction step,
- oby processing, for several first matrices and for several second matrices, a parameter representative of a product of both first and second matrices respectively representing the pixels of both a first and a second images, wherein:
both quantum singular value estimation of first matrix and quantum singular value estimation of second matrix are estimated each and are combined together so as to get at a quantum singular value estimation of said product of both first and second matrices, by applying to both first and second matrices following quantum circuit including:
- oa first Hadamard gate whose output is the input of a first inverted quantum Fourier transform,
- osaid first Hadamard output controlling following sub-circuit,
  - a second Hadamard gate whose output is the input of a second inverted quantum Fourier transform,
  - said second Hadamard output controlling a quantum memory,
- ooutput of said first inverted quantum Fourier transform will give said quantum singular value estimation of said product of both first and second matrices, once said quantum memory has successively contained first matrix and second matrix, said quantum singular value estimation of said product of both first and second matrices being said parameter representative of said product of both first and second matrices.

15. The method of analysis of images according to claim 14, wherein:
wherein:
both quantum singular value estimation of first matrix and quantum singular value estimation of second matrix are estimated each and are combined together so as to get at a quantum singular value estimation of said product of both first and second matrices, by making a phase estimation of an entity at least successively performing:
- oquantum singular value estimation of first matrix,
- oquantum rotations, proportional to estimated singular values of first matrix,
- oquantum singular value estimation of second matrix,
- oquantum rotations, proportional to estimated singular values of second matrix, while applying to both first and second matrices following quantum circuit including:
- oa first Hadamard gate whose output is the input of a first inverted quantum Fourier transform,
- osaid first Hadamard output controlling following sub-circuit,
  - a second Hadamard gate whose output is the input of a second inverted quantum Fourier transform,
  - said second Hadamard output controlling a quantum memory,
- ooutput of said first inverted quantum Fourier transform will give said quantum singular value estimation of said product of both first and second matrices, once said quantum memory has successively contained first matrix and second matrix, said quantum singular value estimation of said product of both first and second matrices being said parameter representative of said product of both first and second matrices.

16. The method of claim 15, wherein the step of performing quantum rotations, proportional to estimated singular values of first matrix is performed as quantum rotations on Y axis of Bloch sphere, proportional to estimated singular values of first matrix.

17. The method of claim 16, wherein the step of performing quantum rotations, proportional to estimated singular values of second matrix is performed as quantum rotations on Y axis of Bloch sphere, proportional to estimated singular values of second matrix.

18. The method of claim 15, wherein the step of performing quantum rotations, proportional to estimated singular values of second matrix is performed as quantum rotations on Y axis of Bloch sphere, proportional to estimated singular values of second matrix.

* * * * *